UNITED STATES PATENT OFFICE.

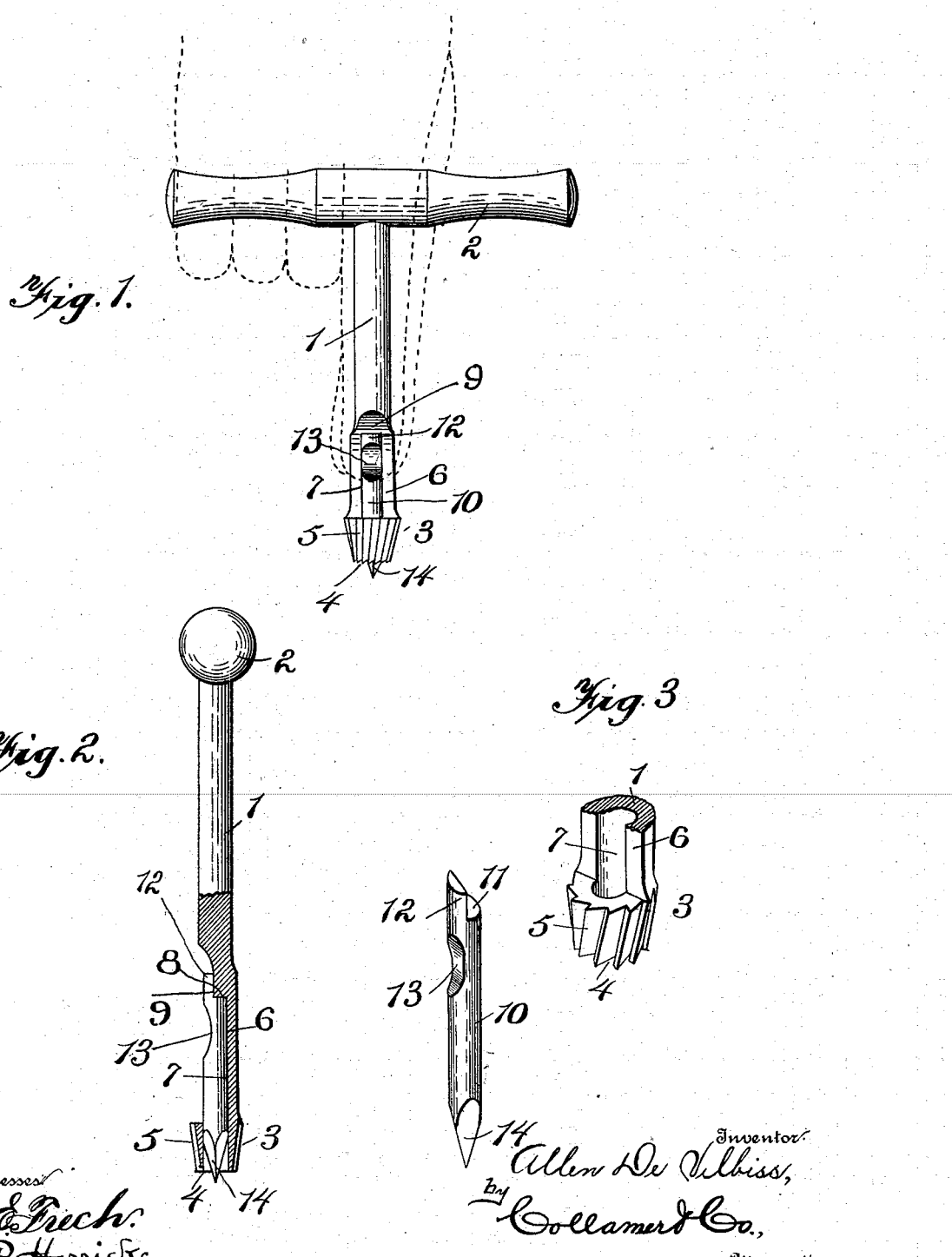

ALLEN DE VILBISS, OF TOLEDO, OHIO.

TREPHINE.

SPECIFICATION forming part of Letters Patent No. 651,921, dated June 19, 1900.

Application filed March 8, 1900. Serial No. 7,842. (No model.)

*To all whom it may concern:*

Be it known that I, ALLEN DE VILBISS, a citizen of the United States, and a resident of Toledo, Lucas county, State of Ohio, have invented certain new and useful Improvements in Trephines; and my preferred manner of carrying out the invention is set forth in the following full, clear, and exact description, terminating with claims particularly specifying the novelty.

This invention relates to surgery, and more especially to that class of tools used therein known as "trephines;" and the object of the same is to improve the construction of a tool of this character.

To this end the invention consists in supporting the centering-point loosely and removably, so that it can be held temporarily in place by the operator's finger; and the invention further consists in details of construction, which will appear in the following specification, and all of which are shown in the drawings, wherein—

Figure 1 is a front elevation of this device in use, with the operator's hand in dotted lines. Fig. 2 is a vertical section through the stem and point. Fig. 3 is an enlarged perspective detail of the lower end of the tool and of the point removed therefrom.

In devices of this character or for analogous use it is common to make the centering-point movable within the tubular head. A point is employed with a hollow auger in order that the teeth of the annular active face of the latter will work continually around the same ring until it has penetrated to sufficient depth to form a hole, or at least a cavity, within which the radial flutes will work, after which the tool will center itself, and the center is not further useful. In ordinary instances the point at this time may remain in place and continue to do its work, or it may be moved upward, or it may be permitted to move automatically upward, as by compressing a spring; but in using a trephine care must be taken that the "button" being bored out of the skull is not pushed through the same after it becomes detached, for otherwise serious results might ensue. My present invention is designed to permit this work to be done in the most effectual manner and by the very simplest means, and in carrying out the invention I have in mind the desirability of using few parts for the sake of cheapness of manufacture and cleanliness in use and of so shaping those parts as to lengthen the life of the tool and permit it to be sharpened when required.

Referring to the said drawings, 1 is a stem having at its upper end a handle 2 and at its lower end a head 3. The latter is preferably conical in contour and is hollow, with its bore cylindrical. On its lower end it has an annular series of teeth 4, serving in use as a hollow auger, and on its outer face it has radial teeth or flutes 5, serving in use as a reamer to enlarge the hole made by the teeth 4. The body of the stem above the head 3 is cut away or halved, as at 6, so as to expose the bore 7, which is continued upward in a groove in the half remaining opposite this cut-away portion and preferably has a flat shoulder 8 at its upper end. The material of the remaining half of the stem continues alongside the bore, and above the shoulder 8 is a face 9, flat for a distance and then curved, so that the material grows thicker until it merges into the stem 1. The button is cut by the teeth 4 and may pass up the bore 7 and drop out its open side above the head. In boring through thin material, such as the human skull, after the button has been taken out the hole may be enlarged by continuing the operation, which brings the flutes 5 into play.

The numeral 10 designates the body of the center, which is cylindrical and of a size to fit loosely within the bore 7. Although its upper end may be of any desired shape, I preferably form it with a shoulder 11, whose flat upper face is adapted to rest against the shoulder 8 at the upper end of the bore and whose upright face forms, with the remaining portion of the body, a lip 12, that passes over and rests upon the face 9. Below this lip the cylindrical body of the center is cut away or formed with a slight depression 13, shaped to receive the tip of the operator's forefinger, as indicated in Fig. 1, and located so that it will be exposed when the center is in place. The point 14 at the lower end of the center may be of any suitable shape; but by preference I grind the cylindrical body on three or more flat sides converging to the axial line, the reason for this being that it is ordinarily easier to grind flat faces than those of other shape. The length of the center from the extremity of the point to the flat face of the shoulder 11 is a trifle greater than from the tips of the teeth 4 to the flat face of the shoulder 8, whereby the point 14 protrudes normally slightly beyond the active end of the head.

The parts are preferably of metal, with the working surfaces or portions thereof tempered, and the precise details of construction are not material, except as hereinafter specified.

In operation the center is inserted and the tool is grasped, as seen in Fig. 1, with the forefinger resting in the depression 13 to hold the center from falling out. The latter is inserted in the skull and pressed or twisted thereinto until the end teeth 4 begin to work. Meanwhile rotation of the point is prevented by the fact that the lip 12 lies on the flat portion of the face 9, and of course the center cannot become displaced. The tool is rotated to the right, assuming that the teeth 4 face in that direction, until a shallow ring has been formed. Then the tool is withdrawn and the finger removed, which allows the center to fall out. The tool is immediately replaced with the teeth 4 within the ring in the skull, and the operation is repeated until the latter is perforated, the button passing upward into the bore 7. The tool may be then either further rotated to enlarge the hole radially by means of the flutes 5, in which case the button will remain within the bore, or the tool can be removed and the button knocked or pushed out of either end of the bore. The advantage of this construction over those which employ a permanent center or one actuated by a spring is that before complete perforation is effected and the button has been formed the point has been entirely removed, thus not only leaving a free passage for the button, but also avoiding every tendency of the button to pass or be pushed within the patient's skull.

What is claimed as new is—

1. In a trephine, the combination with a tubular head provided exteriorly with cutting-teeth, and a stem secured to the head, the bore of the latter extending upward into the stem and having a flat upper end and a lateral opening; of a center fitting loosely and removably in said bore and having a shoulder resting against said flat upper end when its point protrudes slightly beyond the head, as and for the purpose set forth.

2. In a trephine, the combination with a tubular head provided exteriorly with cutting-teeth, and a stem secured to the head and halved above it so that the bore extends from the head upward along the stem, is open at one side, and has a flat shoulder at its upper end above which the stem has a face; of a center fitting loosely and removably in said bore and having a shoulder and lip at its upper end, the point at its lower end projecting beyond said head when the two shoulders engage and the lip lies upon said face, as and for the purpose seth forth.

3. In a trephine, the combination with a tubular head provided exteriorly with cutting-teeth, and a stem secured to the head and halved above it so that the bore extends from the head upward along the stem, is open at one side, and has a flat shoulder at its upper end; of a center fitting loosely in said bore, and having a shoulder at its upper end and a depression in one side of its body, the point at its lower end projecting beyond said head when the two shoulders engage, as and for the purpose set forth.

4. In a trephine, the combination with a tubular head provided exteriorly with cutting-teeth, and a stem secured to the head and halved above it so that the bore extends from the head upward along the stem, is open at one side, and has a flat shoulder at its upper end above which the stem has a face flat for a distance and then curved outward into the stem-body; of a center fitting loosely in said bore and having a shoulder and lip at its upper end and a depression in one side of its body, the point at its lower end projecting beyond said head when the two shoulders engage and the lip lies upon said face, as and for the purpose set forth.

In testimony whereof I have hereunto subscribed my signature this the 6th day of March, A. D. 1900.

ALLEN DE VILBISS.

Witnesses:
J. T. GREER,
H. T. GREER.